United States Patent [19]

Suyama et al.

[11] Patent Number: 5,875,078
[45] Date of Patent: Feb. 23, 1999

[54] MAGNETORESISTANCE THIN FILM MAGNETIC HEAD HAVING REDUCED TERMINAL COUNT; AND BIAS CHARACTERISTICS MEASURING METHOD

[75] Inventors: Hideo Suyama; Takuji Shibata; Norio Saito; Mamoru Sasaki; Akio Takada; Jin Sato; Shuichi Haga, all of Miyagi, Japan

[73] Assignee: Sony Corporation, Tokyo, Japan

[21] Appl. No.: 694,182

[22] Filed: Aug. 8, 1996

Related U.S. Application Data

[63] Continuation of Ser. No. 202,003, Feb. 25, 1994, abandoned.

[30] Foreign Application Priority Data

Feb. 26, 1993 [JP] Japan .................................. 5-063378

[51] Int. Cl.$^6$ ........................................................ G11B 5/39
[52] U.S. Cl. ................................................................. 360/113
[58] Field of Search ..................................... 360/113, 125, 360/126

[56] References Cited

U.S. PATENT DOCUMENTS

| | | | |
|---|---|---|---|
| 3,921,217 | 11/1975 | Thompson | 360/113 |
| 4,807,074 | 2/1989 | Kano | 360/113 |
| 4,853,633 | 8/1989 | Matsumoto | 360/113 |
| 4,860,138 | 8/1989 | Vinal et al. | 360/113 |
| 4,896,235 | 1/1990 | Takino et al. | 360/113 |
| 4,922,360 | 5/1990 | Takano et al. | 360/113 |
| 5,081,554 | 1/1992 | Das | 360/113 |
| 5,218,497 | 6/1993 | Tanabe et al. | 360/113 |
| 5,287,237 | 2/1994 | Kitada et al. | 360/113 |
| 5,331,492 | 7/1994 | Konai et al. | 360/113 |

FOREIGN PATENT DOCUMENTS

| | | | |
|---|---|---|---|
| 0 107 982 | 5/1984 | European Pat. Off. | |
| 0 221 540 | 5/1987 | European Pat. Off. | |
| 0 459 404 | 12/1991 | European Pat. Off. | |
| 60-47222 | 3/1985 | Japan | 360/113 |
| 61-104413 | 5/1986 | Japan | 360/113 |
| 62-159318 | 7/1987 | Japan | 360/113 |
| 1-211313 | 8/1989 | Japan | 360/113 |
| 2-54413 | 2/1990 | Japan | 360/113 |
| 5-143937 | 6/1993 | Japan | 360/113 |
| WO 88/07741 | 10/1988 | WIPO | |

*Primary Examiner*—Jefferson Evans
*Attorney, Agent, or Firm*—Hill & Simpson

[57] ABSTRACT

In a magnetoresistance thin film magnetic head, a bias conductor and a magnetoresistive magnetic sensing section are electrically connected to each other in series. Further, the bias conductor (7) is formed in such a pattern as to have a width and distance from a magnetic recording medium facing surface which become larger as it is away from a portion transversing the magnetoresistive magnetic sensing section.

3 Claims, 8 Drawing Sheets

MAGNETORESISTANCE THIN FILM MAGNETIC HEAD HAVING REDUCED TERMINAL COUNT; AND BIAS CHARACTERISTICS MEASURING METHOD

This is a continuation of application Ser. No. 08/202,003, filed Feb. 25, 1994 abandoned.

BACKGROUND OF THE INVENTION

1. Field of the Invention

This invention relates to a magnetoresistance thin film magnetic head which is suitable for reproducing signals recorded in a hard disc and to a bias characteristics measuring method therefor.

2. Description of the Related Art

For a reproducing head of a hard disc drive or a driving device, a magnetoresistance thin film magnetic head exhibiting high sensitivity to short wavelength signals, hereinafter referred to as an MR head, is employed in general.

The MR head is a reproducing head utilizing a phenomenon of magnetoresistance effect in which electrical resistance varies in accordance with an angle formed by the direction of magnetization with the direction of an internal current. In the MR head, an MR magnetic thin film receives a leakage magnetic flux from a magnetic recording medium, having its direction of magnetization turned by the magnetic flux. The direction of magnetization forms an angle corresponding to the magnetic property with the direction of the current running through the inside of the MR magnetic thin film. Therefore, the electrical resistance of the MR magnetic thin film changes, and a change in voltage corresponding to the change in the electrical resistance appears at electrodes at both ends of the MR magnetic thin film. Thus, the magnetically recorded signals can be read out as voltage signals.

The MR head, if used as the reproducing head of the hard disc drive, has a shielding construction in which a magnetoresistance effect magnetic sensing section 54 and a bias conductor 55 are sandwiched between a pair of magnetically shielding thin film magnetic cores 56, 57 via an insulating layer 58, as shown in FIGS. 1 and 2. The magnetoresistance effect magnetic sensing section 54, hereinafter referred to as an MR magnetic sensing section, consists of a magnetoresistance effect thin film formed by stacking electrodes 52, 53 on a distal end and a rear end, respectively, of an air bearing surface (ABS) 51, that is, a surface facing the hard disc, while the bias conductor 55 provides a magnetized status in a predetermined direction for the MR magnetic sensing section 54. The MR head of the above construction is loaded to be used on a slider member 59 of $Al_2O_3$—TiC or the like.

In the MR head of such construction, for reproduction of signals, direct currents are supplied as sense currents from the distal end electrode 52 and the rear end electrode 53 of the MR magnetic sensing section 54, while a direct current is supplied to the bias conductor 55 for generating a biased magnetic field. Accordingly, terminals 60, 61, 62, 63 for connection to a direct current power source are provided on the edges of the distal end electrode 52 and the rear end electrode 53 and both edges of the bias conductor 55, respectively. Thus, a total of four terminals are disposed on the slider member 59.

However, in the MR head of the above construction, the necessity of disposing the four terminals 60, 61, 62, 63 on the slider member 59 causes large obstruction to diminution of the hard disc drive in size and achievement of low levitation.

That is, the head employed in the hard disc drive further includes an inductive head for recording stacked on the MR head for reproduction. In the inductive head, a thin film magnetic core on the upper layer shielding the MR magnetic sensing section as one thin film magnetic core constituting a closed magnetic circuit and the other thin film magnetic core stacked to face the one thin film magnetic core have their respective magnetically connecting sections spirally surrounded by a head coil. From both ends of the head coil of the inductive head, two terminals are led, respectively, for supplying currents based on recorded information. Therefore, with the MR head of the above construction, a total of six terminals are disposed on the slider member 59, that is, the four terminals 60, 61, 62, 63 of the MR head plus the two terminals 65, 66 of the inductive head, as shown in FIG. 3.

For disposing as many terminals as six on the slider, however, it is necessary to reduce the terminals in size and to shorten the distance between the terminals. Therefore, there are difficulties in terminal formation and bonding processing on formation of a leader line. Such difficulties become even more serious particularly when the slider is to be reduced in size.

For achieving low levitation of the head, a constant levitation attitude of the slider is strictly required. However, the rigidity of the large number of terminals formed on the slider causes difficulties in the slider's being in a constant leviation attitude. This is disadvantageous to achievement of low leviation.

For this reason, an attempt has been made to reduce the number of terminals disposed on the slider to 5, using one terminal for one of the terminals led from the bias conductor as well as for one of the terminals led from the MR magnetic sensing section. However, even though the number of terminals disposed on the slider is reduced to 5, three terminals are disposed to form one line and the remaining two terminals are disposed to form another line, requiring a disposition area substantially equal to that for 6 terminals. Thus, it is far from a significant reduction in size of the slider.

SUMMARY OF THE INVENTION

In view of the above-described status of the art, it is an object of the present invention to provide a magnetoresistance thin film magnetic head and a bias characteristics measuring method therefor, by which it is possible to reduce the hard disc drive head in size and to achieve low levitation.

According to the present invention, there is provided a magnetoresistance thin film magnetic head having a magnetoresistive magnetic sensing section which has magnetoresistance effect and is formed in such a direction that a sense current runs in a direction substantially the same as a direction of a signal magnetic field, and a bias conductor formed to extend perpendicularly and transversely to the magnetoresistive magnetic sensing section via an insulating layer, the bias conductor having one end thereof electrically connected to an end opposite to a magnetic recording medium facing surface of the magnetoresistive magnetic sensing section.

Also, the magnetoresistive magnetic sensing section and the bias conductor are sandwiched, via an insulating layer, between a first thin film magnetic core and a second thin film magnetic core which are sequentially stacked, with the magnetoresistive magnetic sensing section being electrically connected to the second thin film magnetic core.

In addition, the bias conductor is formed in such a shape as to have a distance from the magnetic recording medium facing surface which becomes longer as it is away from a portion thereof transversing the magnetoresistive magnetic sensing section.

Also, the bias conductor is in an arcuate shape in a vicinity of the portion thereof transversing the magnetoresistive magnetic sensing section.

Further, a leader line for measuring characteristics is attached, extending from a connecting portion between the bias conductor and the magnetoresistive magnetic sensing section.

According to the present invention, there is also provided a bias characteristics measuring method for measuring bias characteristics of a magnetoresistance thin film magnetic head having, on a substrate thereof, at least a magnetoresistive magnetic sensing section which has magnetoresistance effect and is formed in such a direction that a sense current runs in a direction substantially the same as a direction of a signal magnetic field, and a bias conductor formed to extend perpendicularly and transversely to the magnetoresistive magnetic sensing section via an insulating layer, the bias conductor having one end thereof electrically connected to an end opposite to a magnetic recording medium facing surface of the magnetoresistive magnetic sensing section, the method including leading a leader line for measuring characteristics from a connecting portion between the bias conductor and the magnetoresistive magnetic sensing section, and using a leader line led from an end of the bias conductor, a leader line led from an end on magnetic recording medium facing surface of the magnetoresistive magnetic sensing section and the leader line for measuring characteristics.

Further, a third thin film magnetic core constituting a closed magnetic circuit in cooperation with a second thin film magnetic core of the magnetoresistance thin film magnetic head is stacked on the magnetoresistance thin film magnetic head, while a head coil is provided to surround a magnetically connecting portion between the second thin film magnetic core and the third thin film magnetic core, so as to form a magnetically inductive thin film magnetic head, with a leader line led from a connecting portion between the bias conductor and the magnetoresistive magnetic sensing section being electrically connected to an electrode of the head coil to be a leader line for measuring characteristics.

In the magnetoresistance thin film magnetic head, with the one end of the bias conductor being electrically connected to the one end of the MR magnetic sensing section, the other end of the bias conductor and the other end of the MR magnetic sensing section are connected to a direct current power source to be supplied with a direct current. Thus, the direct current can be supplied both to the MR magnetic sensing section and to the bias conductor. Accordingly, it suffices to use these two ends as a current introducing terminal and a current lead-through terminal, without forming these terminals in the MR magnetic sensing section and the bias conductor. Thus, the number of terminals can be reduced.

The bias conductor, if formed in the shape of having a width which becomes larger as it is away from the portion transversing the magnetoresistive magnetic sensing section, has a lower resistance, thus reducing power consumption. Further, the bias conductor, if formed in a shape of having a distance from the ABS which becomes longer as it is away from the portion transversing the magnetoresistive magnetic sensing section, faces a smaller number of tracks other than detection tracks, thus being resistant to the effect of a signal magnetic field and lowering an error rate.

Meanwhile, the bias characteristics of the magnetoresistance thin film magnetic head having one end of the bias conductor thereof electrically connected to one end of the MR magnetic sensing section thereof can be measured, by attaching the leader line to the connecting portion between the bias conductor and the MR magnetic sensing section, setting the end of the leader line as the third terminal, and using the first terminal led from the MR magnetic sensing section, the second terminal led from the bias conductor and the third terminal.

The magnetoresistance thin film magnetic head of the present invention has the one end of the bias conductor thereof electrically connected to the one end of the MR magnetic sensing section thereof, thus reducing the number of terminals to 2. Such magnetoresistance thin film magnetic head, if employed as a reproducing head for the hard disc drive, will allow a reduction in size of the magnetic head for the hard disc drive and low levitation.

The measurement of the bias characteristics of the magnetoresistance thin film magnetic head having the one end of the bias conductor thereof electrically connected to the one end of the MR magnetic sensing section can be made, by attaching the leader line to the connecting portion between the bias conductor and the MR magnetic sensing section, setting the end of the leader line as the third terminal, and using the first terminal led from the MR magnetic sensing section, the second terminal led from the bias conductor and the third terminal.

DETAILED DESCRIPTION OF PREFERRED EMBODIMENTS

Preferred embodiments of the present invention will now be described with reference to the accompanying drawings.

In the present embodiment, the present invention is applied to a composite type magnetic head constituted by an MR head and an inductive head.

Figure 1:
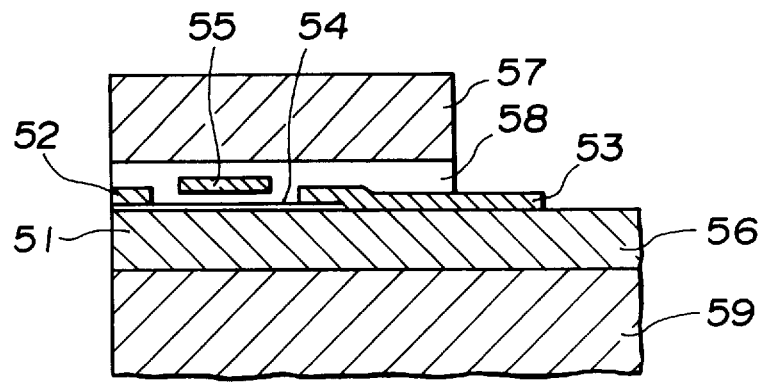
FIG. 1 is a schematic cross-sectional view showing essential portions of a conventional magnetoresistance thin film magnetic head.
Figure 2:
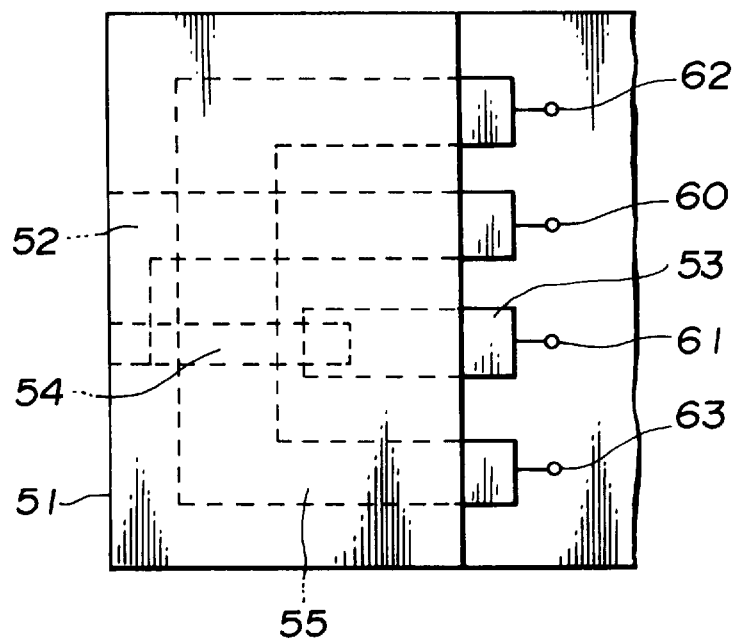
FIG. 2 is a plan view showing a wiring pattern of the magnetoresistance thin film magnetic head shown in FIG. 1.
Figure 3:
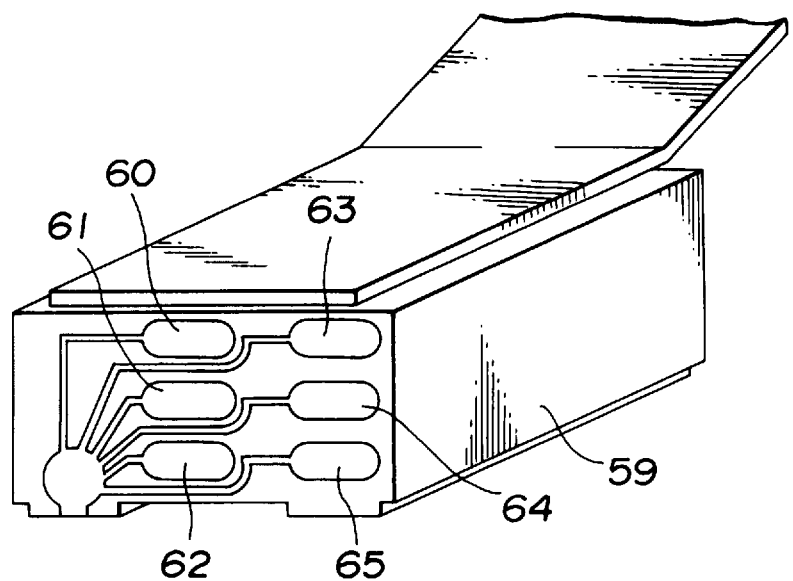
FIG. 3 is a perspective view showing a conventional composite type magnetic head.
Figure 4:
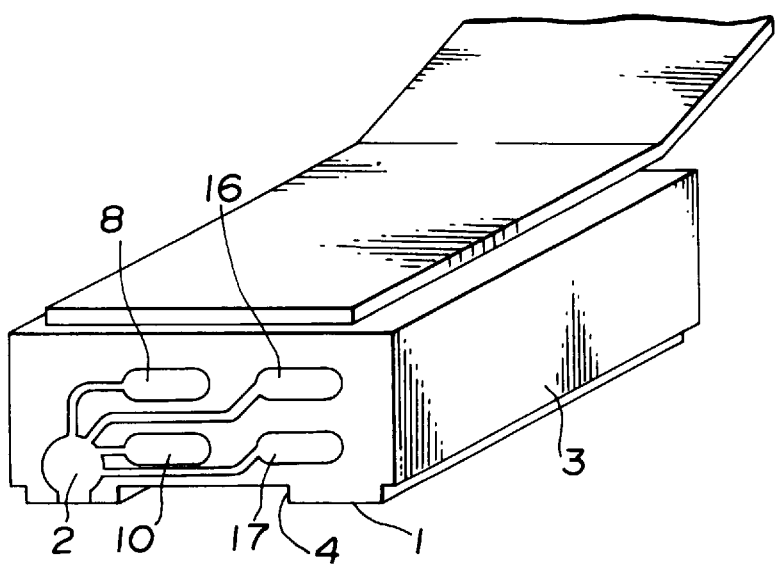
FIG. 4 is a perspective view showing an exemplary composite type magnetic head to which a magnetoresistance thin film magnetic head of the present invention is applied.
Figure 5:
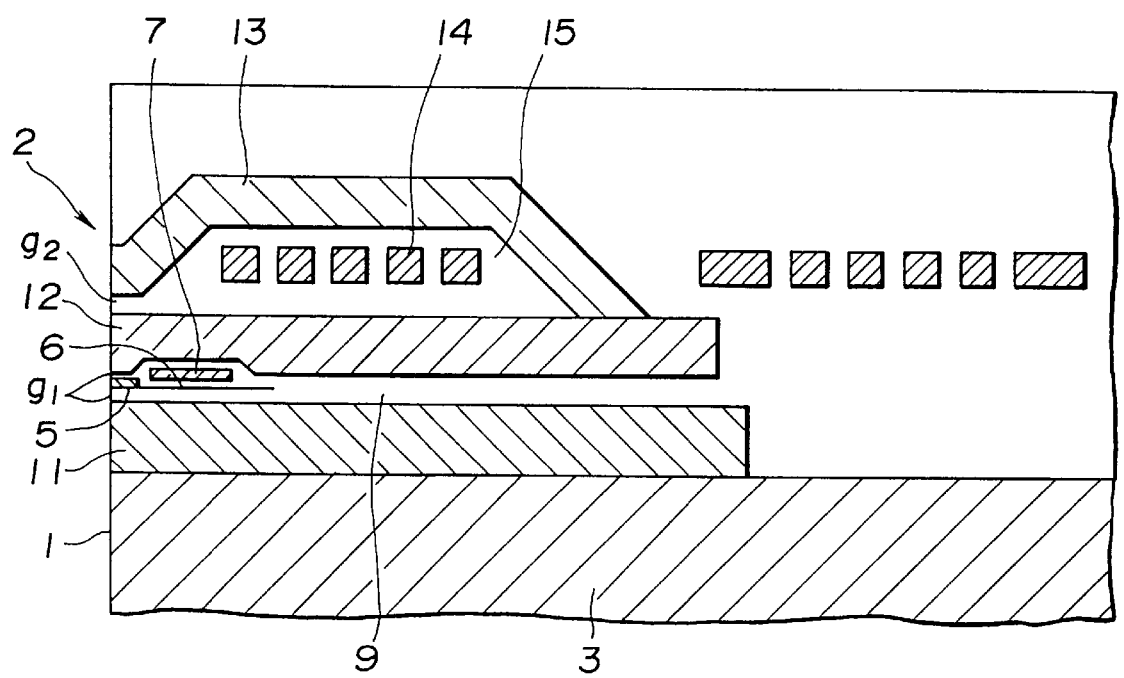
FIG. 5 is a schematic cross-sectional view showing essential portions of the composite type magnetic head shown in FIG. 4.

The composite type magnetic head of the present embodiment has a so-called two-gap type constitution in which an MR head exposing a reproducing magnetic gap g1 to an ABS 1 as a surface facing a hard disc and a head section 2 constituted by an inductive head exposing a recording magnetic gap g2 to the ABS 1 are stacked on one lateral surface of a slider member 3 consisting of an $Al_2O_3$—TiC substrate or the like, as shown in FIGS. 4 and 5.

The slider 3 is formed of a very hard ceramics material such as $Al_2O_3$—TiC, and has a recess 4 as an air inflow groove formed in the travelling direction of the slider in the central portion of the ABS 1.

Figure 6:
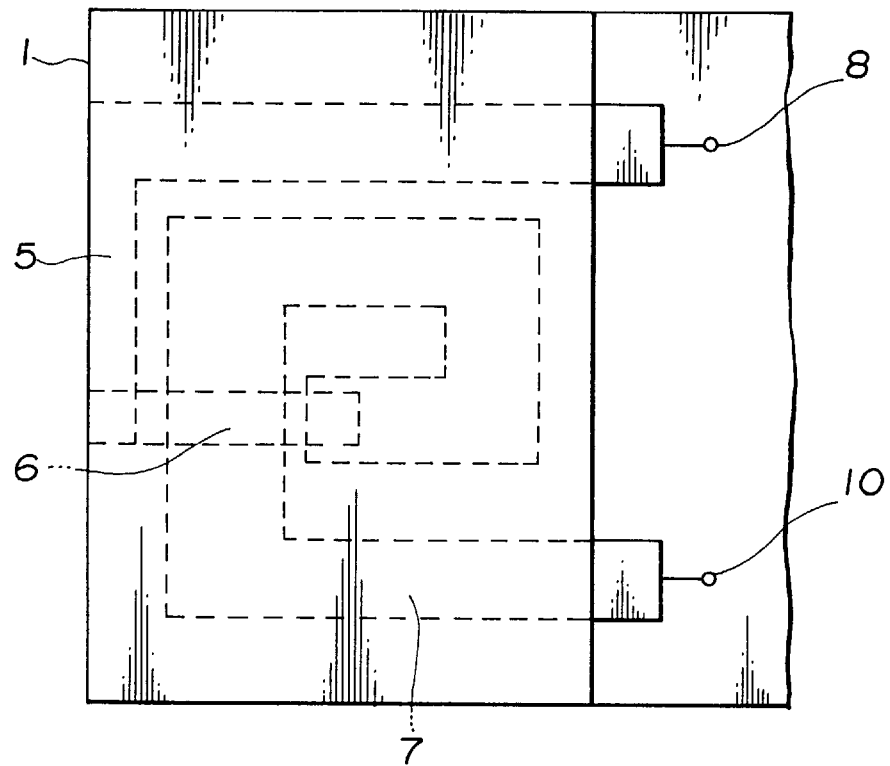
FIG. 6 is a plan view showing a wiring pattern of the magnetoresistance thin film magnetic head loaded on the composite type magnetic head.

The MR head is constituted by an MR magnetic sensing section 6 with a distal end electrode 5 being stacked on the distal end thereof for allowing a current to run through it, and by a bias conductor 7 for providing a magnetic field status in a predetermined direction for the MR magnetic sensing section 6, as shown in FIG. 6. Meanwhile, the end on the side of ABS 1 and the end on the opposite side are hereinafter referred to as the distal end and the rear end, respectively.

Figure 7:
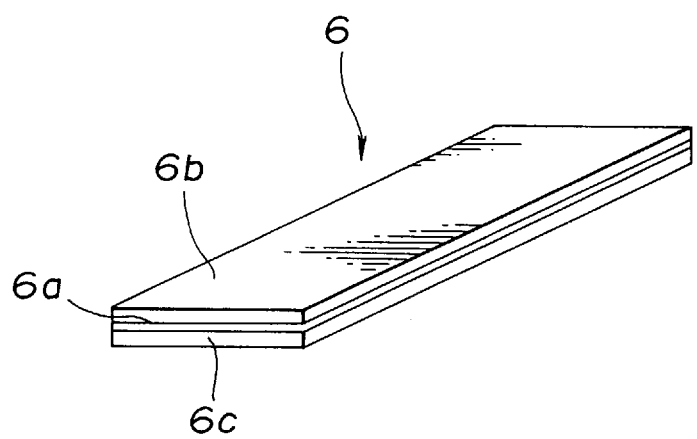
FIG. 7 is a perspective view showing an exemplary construction of a magnetoresistive magnetic sensing section.

The MR magnetic sensing section 6 is formed as a rectangular pattern having a width slightly smaller than the track width of the recording magnetic gap g2 of the inductive head, and causes its longitudinal direction to be perpendicular to the ABS 1, with its one end edge being exposed to the ABS 1. The MR magnetic sensing section 6 is constituted by a pair of MR thin films 6b, 6c which are magnetostatically combined and stacked via a non-magnetic insulating layer 6a, as shown in FIG. 7. With this constitution, a substantially single domain is generated when a sense current is caused to run, thus avoiding generation of a Barkhausen noise. The MR thin films 6b, 6c are formed of e.g. highly magnetic body thin films of NiFe or the like, having a thickness of about tens of nm. The non-magnetic insulating layer 6a is formed of $SiO_2$ or the like, having a thickness of about several nm.

The distal end electrode 5 is formed as a wiring pattern having a substantially L-shaped plane, as shown in FIG. 6. the distal end electrode 5 has its one end stacked on the distal end of the MR magnetic sensing section 6, and allows one lateral side edge of the wiring pattern on the side stacked on the MR magnetic sensing section 6 to be exposed to the ABS 1. The end of the wiring pattern led out to the back side from the distal end electrode 5 is set to be a first terminal 8 for connection to the direct current power source.

The bias conductor 7 is formed as a wiring pattern of plane loop shape, and is stacked on the MR magnetic sensing section 6 with a predetermined distance via an insulating layer 9. The bias conductor 7 causes its one end to overlap the rear end of the MR magnetic sensing section 6 and is curved from the one end to re-overlap the MR magnetic sensing section 6. The bias conductor 7 is provided to transverse the MR magnetic sensing section 6 in the overlapping portion. The one end overlapping the MR magnetic sensing section 6 is electrically connected to the rear end of the MR magnetic sensing section 6 via a contact hole, while the other end, not overlapping the MR magnetic sensing section 6, is led out to the back side to be a second terminal 10 for connection to a direct current power source. In short, the MR magnetic sensing section 6 and the bias conductor 7 are electrically connected in series.

Consequently, when the end of the distal end electrode 5 stacked on the MR magnetic sensing section 6, that is, the first terminal 8, and the end of the bias conductor, that is, the second terminal 10, are connected as the current introducing section and the current lead-through section, respectively, to the direct current power source so as to be supplied with the current, the current is supplied as the sense current through the distal end electrode 5 to the MR magnetic sensing section 6. Then, the current which is continuously supplied to the bias conductor 7 is passed through the bias conductor 7 to be led through from the second terminal 10. That is, with the use of the first terminal 8 and the second terminal 10, the direct current can be supplied both to the MR magnetic sensing section 6 and to the bias conductor 7.

If the MR magnetic sensing section 6 and the bias conductor 7 are not electrically connected to each other, it is necessary to form the current lead-through terminal and the current introducing terminal separately on the MR magnetic sensing section 6 and the bias conductor 7, for supplying the current to the MR magnetic sensing section 6 and the bias conductor 7. That is, a total of four terminals of the MR head are to be disposed on the slider. On the contrary, if the MR magnetic sensing section 6 and the bias conductor 7 are electrically connected to each other, it suffices to provide the first terminal 8 and the second terminal 10 as described above. Thus, the number of terminals disposed on the slider member 3 can be reduced.

The reduction in the number of the terminals as described above can be achieved by the electrical serial connection between the MR magnetic sensing section 6 and the bias conductor 7. Accordingly, similar effects can be produced by stacking the rear end electrode on the rear end of the MR magnetic sensing section 6, and then connecting the bias conductor 7 to the MR magnetic sensing section 6 in series.

Figure 8:
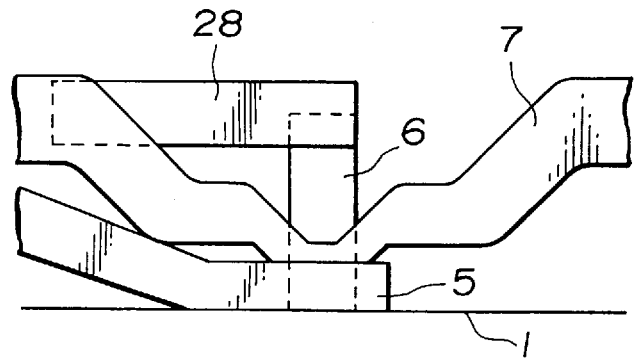
FIG. 8 is a plan view showing an exemplary shape of a bias conductor.
Figure 9:
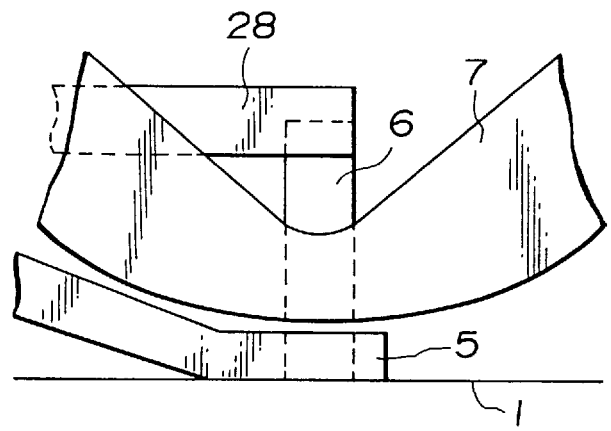
FIG. 9 is a plan view showing another exemplary shape of the bias conductor.
Figure 10:
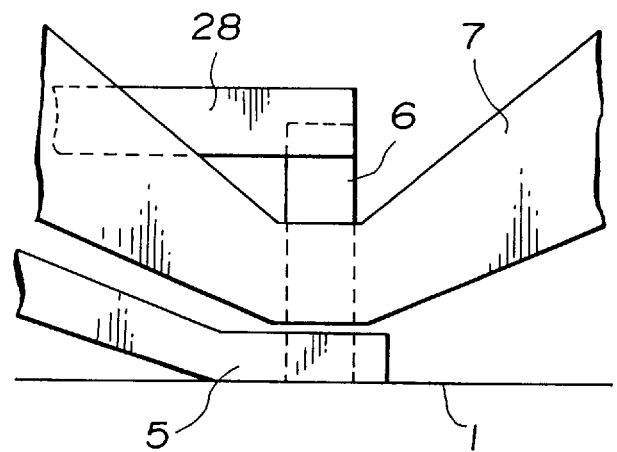
FIG. 10 is a plan view showing still another exemplary shape of the bias conductor.

The bias conductor 7 has a resistance which becomes lower as the wiring distance is shorter, thus reducing power consumption. As shown in FIGS. 8 through 10, only the portion transversing the MR magnetic sensing section 6 relating to a biased magnetic field is small in width. Thus, if the bias conductor 7 is formed in a shape of having a width which becomes larger as it is away from the transversing portion, that is, a shape of having a distance from the ABS 1 which becomes longer as it is away from the transversing portion, such as an arcuate shape extending toward the back side as shown in FIG. 9, a reduction in width and the wiring distance can be achieved effectively and thus a reduction in power consumption can be expected. Besides, if the bias conductor 7 has such as shape as to have a distance from the ABS 1 which is longer as it is away from the transversing portion, it faces a smaller number of tracks other than detection tracks. Therefore, the bias conductor 7 becomes more resistant to the effect of the signal magnetic field, so as to be advantageous in consideration of a reduction in error rate. Meanwhile, in each of the wiring patterns shown in FIGS. 8 through 10, the MR magnetic sensing section 6 and the bias conductor 7 are electrically connected to each other via an rear end electrode.

The MR head is of the so-called shielding construction in which the MR magnetic sensing section 6 is sandwiched via the insulating layer 9 between a first thin film magnetic core 11 and a second thin film magnetic core 12 which are made up of magnetic bodies such as permalloy, as shown in FIG. 5. The shielding construction is provided here on the basis of the necessity of short wavelength reproduction with an MR head of this type and the necessity of a reproducing waveform which is the same as a differential output waveform of the inductive head. The first thin film magnetic core 11 and the second thin film magnetic core 12 are provided to extend perpendicularly to the ABS 1, having their respective one ends exposed to the ABS 1.

The second thin film magnetic core 12 functioning as the shield may be electrically connected to the MR magnetic sensing section 6, so as to function also as a distal end electrode. Thus, the necessity for distal end electrode formation is eliminated, and simplification of production processes can be expected.

Meanwhile, in the inductive head, the second thin film magnetic core 12 is the other core for constituting the closed magnetic circuit, as shown in FIG. 5. The second thin film magnetic core 12 and a third thin film magnetic core 13 stacked to face the thin film magnetic core 12 are exposed to the ABS 1 so as to constitute the recording magnetic gap g2 between their respective forward ends. That is, the third thin film magnetic core 13 stacked to face the second thin film magnetic core 12 is bent toward the second thin film magnetic core 12 at the forward end exposed to the ABS 1, constituting the recording magnetic gap g2 in a narrow section where the second and third thin film magnetic cores 12, 13 face each other. The third thin film magnetic core 13 magnetically contacts the second thin film magnetic core 12 at their respective rear ends, constituting a back gap.

The magnetically connecting portion between the third thin film magnetic core 13 and the second thin film magnetic core 12 are provided with a spiral head coil 14 surrounding the magnetically connecting portion. The head coil 14 is buried in an insulating layer 15 for assuring the insulation of the third thin film magnetic core 13 and the second thin film magnetic core 12. The starting and end edges of the head coil 14 are disposed on the slider member 3 as terminals through which a recording current from the alternating current supplied by the coil runs. In this head, the number of terminals disposed on the slider member 3 is four in total as shown in FIG. 4, that is, the two terminals 8, 10 of the MR head as previously shown and two terminals 16, 17 of the inductive head. Accordingly, the disposition area for the terminals on the slider member 3 can be reduced, thus reducing the slider member 3 in size, while the deterioration of levitation attitude due to rigidity of the terminals can be limited, thus allowing easy achievement of low levitation.

For the recording with the use of such composite type magnetic head, a current is supplied from the alternating current power source to the terminals 16, 17 of the head coil 14. Thus, the magnetic flux based on the recorded information is generated from the recording magnetic gap g2 exposed to the ABS 1, magnetizing the magnetic recording medium for consequent recording.

On the other hand, the current of the direct current power source is supplied from the first terminal 8 of the distal end electrode 5 stacked on the distal end of the MR magnetic sensing section 6 and from the second terminal 10 of the bias conductor 7. Thus, the sense current is supplied to the MR magnetic sensing section 6, and the biased magnetic field is generated in the bias conductor 7.

Figure 11:
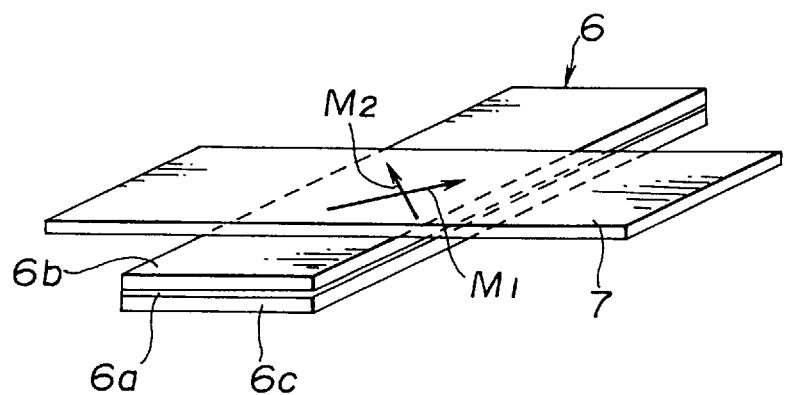
FIG. 11 is a schematic view for illustrating a magnetized status of the magnetoresistive magnetic sensing section to which a biased magnetic field is applied.

The MR thin films 6b, 6c constituting the MR magnetic sensing section 6 as shown in FIG. 7 are in a magnetized status in which magnetic domains in opposite directions are alternately arrayed in parallel in the initial stage. The biased magnetic field, when externally applied to the MR magnetic sensing section 6 in the direction of the sense current, causes the direction of magnetization of the magnetic thin film to turn by a predetermined angle as indicated by an arrow shown in FIG. 11. The MR magnetic sensing section 6 in such magnetized status, if provided with the signal magnetic field in the direction of the sense current, has its direction of magnetization turned in accordance with the magnitude of the signal magnetic field, thus causing a change in resistance. With this change in resistance being detected, the signals are reproduced. Meanwhile, an arrow M1 in FIG. 11 denotes the direction of magnetization of the upper MR thin film 6b, while an arrow M2 denotes the direction of magnetization of the lower MR thin film 6c.

In the composite type magnetic head, head evaluation with the MR head being in a state of wafer (in a state of being formed on the substrate block as the head device before assembly) is conducted, in general, by measuring bias characteristics thereof.

That is, a triangular wave current of low frequency of up to 0.9 Hz which can be regarded as a direct current and a minute sine wave current of frequency of up to 70 kHz are simultaneously supplied to the bias conductor 7, and the voltage change waveform of the MR magnetic sensing section 6 is observed. Thus, head characteristics are evaluated.

The method of head evaluation for the MR head of two terminals in which the bias conductor 7 and the MR magnetic sensing section 6 as shown above are connected in series to each other is described hereinafter.

Figure 12:
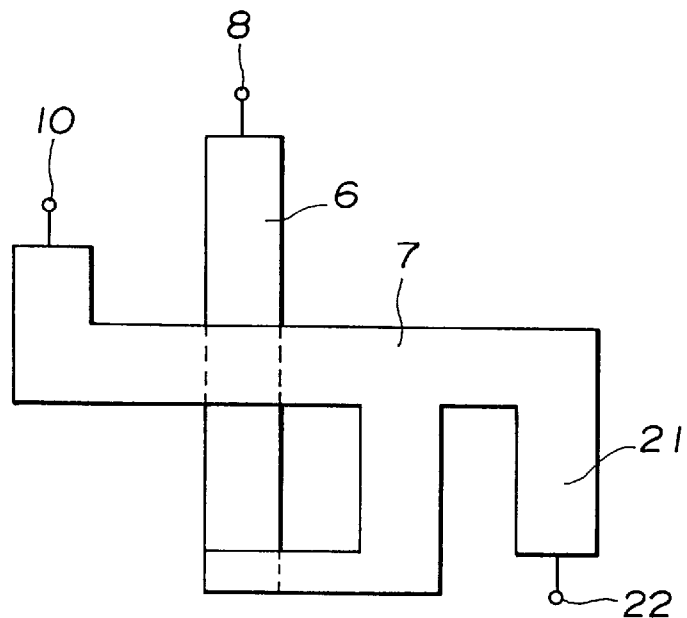
FIG. 12 is a plan view showing a wiring pattern of the magnetoresistance thin film magnetic head to which a measuring leader line is attached.

An electrode 21 for measuring characteristics is attached to the connecting portion between the bias conductor 7 and the MR magnetic sensing section 6, as shown in FIG. 12, having its end being used as a third terminal 22. Then, the bias characteristics are measured with the use of the first terminal 8, the second terminal 10 and the third terminal 22.

Figure 13:
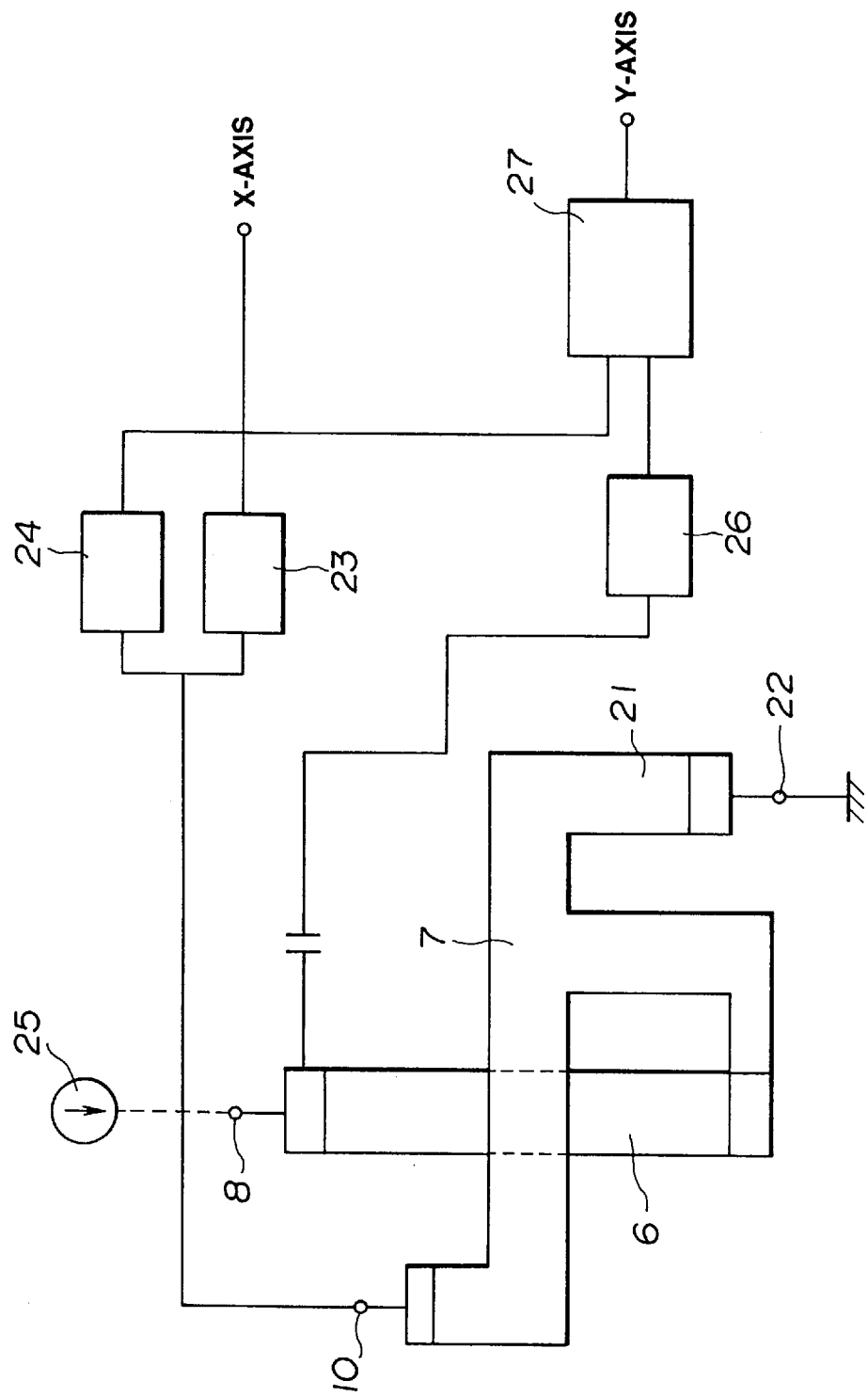
FIG. 13 is a schematic view for illustrating the bias characteristics measuring method for the magnetoresistance thin film magnetic head.

The attached third terminal 22 is first grounded, as shown in FIG. 13, and the direct current power source 25 is connected to the first terminal 8 of the MR magnetic sensing section 6. Thus, MR magnetic sensing section 6 is supplied with the sense current.

On the other hand, the second terminal 10 of the bias conductor 7 provided on the opposite side to the connection end with the MR magnetic sensing section 6 is connected to an alternating current power source 23 for supplying a triangular wave of approximately 0.9 kHz, 50 mA, and to an alternating current power source 24 for supplying a sine wave of approximately 70 kHz, 1 mA. Thus, the bias conductor 7 is supplied with the triangular wave and the sine wave. Since the triangular wave is larger than the sine wave, the magnitude of the biased magnetic field of the bias conductor 7 is controlled substantively by the triangular wave, and the minute biased magnetic field due to the sine wave is superposed thereon.

Figure 14:
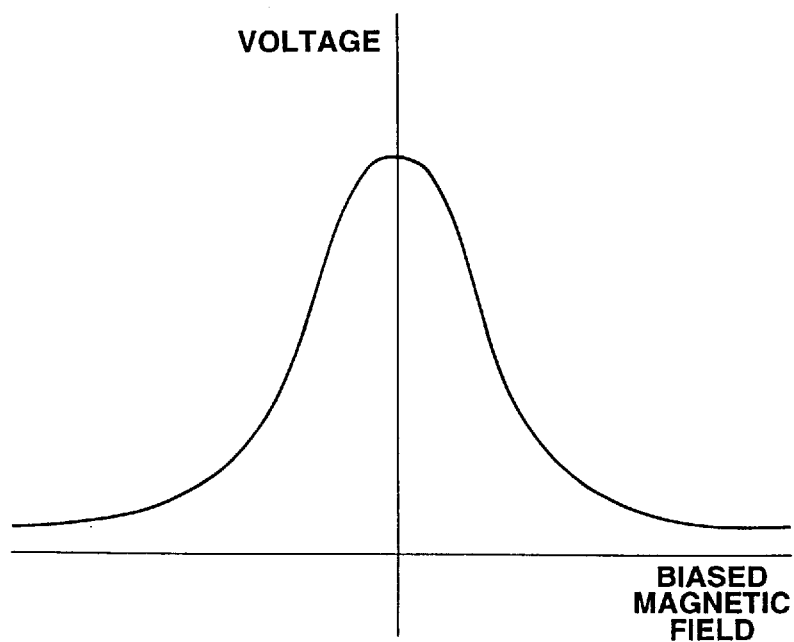
FIG. 14 is a graph showing a relation between a magnetic field of the bias conductor and a voltage of the magnetoresistive magnetic sensing section.

If the two types of alternating currents are thus supplied to the bias conductor 7, the biased magnetic field generated in the bias conductor 7 by the triangular wave fluctuates largely and slowly on the horizontal axis in FIG. 14, and at the same time, the fluctuation of the minute magnetic field is added to the MR magnetic sensing section 6 by the sine wave. The fluctuation of the minute magnetic field due to the sine wave operates as the input signal from the magnetic recording medium, causing the voltage change due to the change in resistance of the MR magnetic sensing section 6 to be taken out as an output change.

Thus, if the output signal from the MR magnetic sensing section 6 is amplified by an amplifier 26 and is then processed with synchronous wave detection by a synchronous wave detector 27 connected to the alternating current power source 24 for supplying the sine wave, the output level and phase can be known, allowing evaluation of bias characteristics.

Figure 15:
FIG. 15 is a graph showing a differential waveform of the bias characteristics.

For example, a differential waveform of the bias characteristics is shown in FIG. 15, in which the absence of a point of discontinuity due to hysteresis and a Barkhausen jump is an index of preferable bias characteristics.

After the head evaluation in this manner, the attached leader line 21 is detached by dry etching, and then, the composite type head having the two terminals 8, 10 is assembled for completion. The composite type head thus produced allows a reduction in size and low levitation, and has uniform characteristics. Therefore, it can be said that this composite type head is of high quality.

Meanwhile, in the measurement of the bias characteristics in the above-described manner, the leader line 21 led through from the connecting portion between the bias conductor 7 and the MR magnetic sensing section 6 may be electrically connected to the electrode of the head coil of the inductive head, so as to allow the terminal of the head coil to be used as the third terminal.

What is claimed is:

1. A bias characteristics measuring method for measuring bias characteristics of a magnetoresistance thin film magnetic head having, on a substrate thereof, at least a magnetic recording medium facing surface and a magnetoresistive magnetic sensing section which has magnetoresistance effect and is formed extending in a direction transverse to said magnetic recording medium facing surface, and a bias conductor formed to extend perpendicularly and transversely to the magnetoresistive magnetic sensing section via an insulating layer, the bias conductor having one end thereof electrically connected to an end opposite to said magnetic recording medium facing surface of the magnetoresistive magnetic sensing section, the method comprising leading a first leader line for measuring characteristics from a connecting portion between the bias conductor and the magnetoresistive magnetic sensing section, and using a leader line led from an end of the bias conductor, a leader line led from an end on the magnetic recording medium facing surface of the magnetoresistive magnetic sensing section, and the first leader line for measuring characteristics.

2. The bias characteristics measuring method as defined in claim 1, wherein a third thin film magnetic core constituting a closed magnetic circuit in cooperation with a second thin film magnetic core of the magnetoresistance thin film magnetic head is stacked on the magnetoresistance thin film magnetic head, while a head coil is provided to surround a magnetically connecting portion between the second thin film magnetic core and the third thin film magnetic core, so as to form a magnetically inductive thin film magnetic head, with a leader line led from a connecting portion of the bias conductor with the magnetoresistive magnetic sensing section being electrically connected to an electrode of the head coil to be a leader line for measuring characteristics.

3. A magnetoresistance thin film magnetic head having a magnetic recording medium facing surface and a magnetoresistive magnetic sensing section which has magnetoresistance effect and is formed extending in such a direction transverse to said magnetic recording medium facing surface, and a bias conductor formed to extend perpendicularly and transversely to the magnetoresistive magnetic sensing section via an insulating layer, the magnetoresistance thin film magnetic head comprising:

the bias conductor having one end thereof electrically connected to an end which is opposite to said magnetic recording medium facing surface of the magnetoresistive magnetic sensing section, the bias conductor being formed in such a shape as to have a width which becomes immediately larger as it is away form a portion thereof transversing the magnetoresistive magnetic sensing section; and a leader line for measuring characteristics attached to an extending from the connecting portion between the bias conductor and the magnetoresistive magnetic sensing section.

* * * * *